US011218537B2

(12) United States Patent
Gandhi et al.

(10) Patent No.: US 11,218,537 B2
(45) Date of Patent: Jan. 4, 2022

(54) LOAD BALANCING IN DISTRIBUTED COMPUTING SYSTEMS

(71) Applicant: MICROSOFT TECHNOLOGY LICENSING, LLC, Redmond, WA (US)

(72) Inventors: Rohan Gandhi, Seattle, WA (US); Shachar Raindel, Redmond, WA (US); Daniel Firestone, Seattle, WA (US); Jitendra Padhye, Redmond, WA (US); Lihua Yuan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/930,299

(22) Filed: May 12, 2020

(65) Prior Publication Data

US 2021/0126966 A1    Apr. 29, 2021

Related U.S. Application Data

(63) Continuation of application No. 15/438,585, filed on Feb. 21, 2017, now Pat. No. 10,652,320.

(51) Int. Cl.
*H04L 29/08* (2006.01)
*H04L 12/741* (2013.01)
(Continued)

(52) U.S. Cl.
CPC .... *H04L 67/1008* (2013.01); *G06F 15/17331* (2013.01); *G06F 15/76* (2013.01);
(Continued)

(58) Field of Classification Search
CPC ............. H04L 12/4633; H04L 61/2514; H04L 67/1002; H04L 67/1004; H04L 67/1038; H04L 2212/00
See application file for complete search history.

(56) References Cited

U.S. PATENT DOCUMENTS 7,633,955 B1 * 12/2009 Saraiya ................. H04L 49/356
370/395.31
7,860,941 B1 * 12/2010 Wilson .................. H04L 49/358
709/217
(Continued)

FOREIGN PATENT DOCUMENTS

| CN | 104683430 A | 6/2015 |
| CN | 104756466 A | 7/2015 |
| CN | 106133695 A | 11/2016 |

OTHER PUBLICATIONS

"First Office Action and Search Report Issued in Chinese Patent Application No. 201880012983.7", dated Jun. 9, 2021, 6 Pages.

*Primary Examiner* — Shean Tokuta
(74) *Attorney, Agent, or Firm* — Ray Quinney & Nebeker, P.C.; Thomas M. Hardman; Sunah K. Lee

(57) ABSTRACT

Techniques for facilitating load balancing in distributed computing systems are disclosed herein. In one embodiment, a method includes receiving, at a destination server, a request packet from a load balancer via the computer network requesting a remote direct memory access ("RDMA") connection between an originating server and one or more other servers selectable by the load balancer. The method can also include configuring, at the destination server, a rule for processing additional packets transmittable to the originating server via the RDMA connection based on the received reply packet. The rule is configured to encapsulate an outgoing packet transmittable to the originating server with an outer header having a destination field containing a network address of the originating server and a source field containing another network address of the destination server.

20 Claims, 12 Drawing Sheets

(51) Int. Cl.
 *G06F 15/173* (2006.01)
 *G06F 15/76* (2006.01)
(52) U.S. Cl.
 CPC ......... H04L 45/74 (2013.01); H04L 67/1002 (2013.01); *H04L 67/1038* (2013.01); *H04L 67/1097* (2013.01); *H04L 2212/00* (2013.01)

(56) References Cited

U.S. PATENT DOCUMENTS

| | | | |
|---|---|---|---|
| 9,559,990 B2 * | 1/2017 | Makhervaks | H03M 13/093 |
| 10,509,764 B1 * | 12/2019 | Izenberg | G06F 15/167 |
| 10,880,204 B1 * | 12/2020 | Shalev | H04L 69/22 |
| 2006/0168274 A1 * | 7/2006 | Aloni | H04L 69/16 |
| | | | 709/230 |
| 2008/0002578 A1 * | 1/2008 | Coffman | H04L 47/193 |
| | | | 370/230 |
| 2013/0332767 A1 * | 12/2013 | Fox | H04L 67/025 |
| | | | 714/4.3 |
| 2014/0019602 A1 * | 1/2014 | Murthy | H04L 45/00 |
| | | | 709/223 |
| 2014/0108655 A1 * | 4/2014 | Kumar | H04L 67/2814 |
| | | | 709/226 |
| 2015/0026286 A1 * | 1/2015 | Sharp | G06F 15/167 |
| | | | 709/212 |
| 2015/0032835 A1 * | 1/2015 | Sharp | G06F 15/17331 |
| | | | 709/212 |
| 2015/0288763 A1 * | 10/2015 | Kamper | H04L 69/161 |
| | | | 709/212 |
| 2016/0188527 A1 * | 6/2016 | Cherian | H04L 69/22 |
| | | | 709/212 |
| 2017/0034270 A1 * | 2/2017 | Nagasubramaniam | H04L 69/16 |
| 2017/0171075 A1 * | 6/2017 | Sajeepa | H04L 45/745 |
| 2018/0007123 A1 * | 1/2018 | Cheng | H04L 12/4633 |
| 2018/0026873 A1 * | 1/2018 | Cheng | H04L 45/22 |
| | | | 709/239 |
| 2018/0176124 A1 * | 6/2018 | Kancherla | H04L 45/22 |

* cited by examiner

LOAD BALANCING IN DISTRIBUTED COMPUTING SYSTEMS

This application claims priority to U.S. Nonprovisional application Ser. No. 15/438,585, filed Feb. 21, 2017, entitled "LOAD BALANCING IN DISTRIBUTED COMPUTING SYSTEMS," which is incorporated herein by reference in its entirety.

BACKGROUND

Load balancing in computing involves distribution of workloads across multiple computers, computing clusters, network links, central processing units, disk drives, or other computing resources. Implementing load balancing can improve resource utilization, increase throughput, reduce response time, and avoid overloading any single computing resource in computing systems. Using multiple components with load balancing instead of a single component can also increase reliability and availability via redundancy.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Remote direct memory access ("RDMA") is a technique that allows a computer to directly access memory locations of a remote computer via a computer network without involving either one's operating system. An RDMA connection can allow ultra-low latency (e.g., less than about 25 μs) communications between computers. RDMA can also have low processor utilization and high bandwidth on individual connections. RDMA can be implemented in various manners. In one example, RDMA can be implemented using hardware connection adapters ("HCAs") to process RDMA traffic using queue pairs. Such an implementation, however, involves installing HCAs in addition to Ethernet or other types of adapters needed to handle TCP/IP traffic in an existing computer network. RDMA-over-Converged-Ethernet ("ROCE") protocol has been developed to transport RDMA traffic in an IP network.

For proper operation, suitable load balancers typically possess high scalability, high availability, low processing latency, and low capital costs. For example, capacities of load balancers may need to be scalable up or down in order to handle incoming traffic variations. Load balancers also need to be readily available to reduce risks of connection disruptions and packet losses. In certain computing systems, a load balancer can be implemented using a combination of servers and switches in a scale-out design. During operation, when a source (e.g., a server or virtual machine) starts a connection, routers or switches in a computer network can forward packets to a load balancer. The load balancer then randomly selects an end point (e.g., a virtual machine), encapsulates the packets with an IP address of the virtual machine, and forwards the encapsulated packets to a server hosting the virtual machine. At the server, a host agent (e.g., a hypervisor) receives the packets, decapsulates the packets, performs network address translation, and forwards the packets to the virtual machine.

The foregoing technique for processing packets with load balancers can be unsuitable for handling RDMA traffic. In one aspect, the foregoing technique involves high latency and processor usage because a host agent processes all packets in software. In another aspect, packet processing at the load balancer can also inflate latency or results in packet loss and/or congestion because queues at the load balancer can be built up when the load balancer cannot process packets at suitable rates to keep up with the arriving packets. In addition, RDMA semantics (e.g., queue pairs) for connections differ significantly from TCP/IP semantics (e.g., 5-tuple). As such, parsing and translating RDMA packets into TCP/IP packets can further exasperate the foregoing drawbacks.

Several embodiments of the disclosed technology are directed to an RDMA load balancing technique that can address at least some of the foregoing challenges when utilizing load balancers in handling RDMA traffic. According to certain aspects, in one embodiment, a load balancer can announce and receive RDMA connection requests destined to certain or all virtual IP addresses ("VIPs"). The load balancers can be implemented in a scale-out design using multiple commodity servers. The load balancer can then distribute RDMA connection requests across multiple destination servers assigned to the individual VIPs. As such, traffic associated with an RDMA connection request to a VIP can be sent to a destination server selected by the load balancer. In certain embodiments, the routers and the switches can also split connections sent to the VIPs among multiple load balancers.

When an originating node having an originator IP ("OIP") initiates an RDMA connection request, the originating node can transmit a connection request packet destined to a VIP via a computer network. The originating node can be, for example, a server, an operating system, a virtual machine, or an application executing on the server. Upon receiving the connection request packet, the load balancer associated with the VIP can be configured to determine a destination server having a direct IP address ("DIP") assigned to process the connection request. The DIP can be selected by consulting a distribution map based on, for instance, an IP 5-tuple having a source IP address, a source port, or other suitable UDP, TCP/IP, or other suitable types of characteristics of the connection request packet. The load balancer can then encapsulate the connection request packet with the DIP and forward the encapsulated packet to the destination server via the computer network. After forwarding the encapsulated packet, the load balancer may perform no further operations in establishing, maintaining, or dismantling the requested RDMA connection. As such, in the foregoing implementation, the load balancer only handles the first packet for an RDMA connection between the originating node and the destination server.

In certain implementations, servers in a computing system can incorporate a packet handler having hardware circuitry configurable by a host (e.g., an operating system, a hypervisor, a virtual machine, or an application) executing on the servers. Example packet handlers can include field programmable gate array ("FPGA"), application specific integrated circuitry ("ASIC"), a network co-processor, a hardware accelerator, or other suitable hardware components. In certain embodiments, the packet handler can be incorporated into a network interface card ("NIC") in the servers. In other embodiments, the packet handler can be a standalone component or incorporated into a chipset containing a main processor, a co-processor, or other suitable components. In further implementations, the packet handler can be implemented as a software component, a hybrid hardware/software component, or can have other suitable configurations.

Upon receiving the connection request packet, a packet handler of the destination server can forward the packet to a host agent (e.g., a hypervisor) of the server. The host agent can then decapsulate the received packet and optionally perform other suitable packet modifications. Using the received connection request packet, the host agent can generate and configure the packet handler with one or more packet processing rules in order to accelerate processing of the subsequent packets. For example, a first rule can be configured to decapsulate an incoming packet from the source and then change a source address of incoming packet from the VIP to the DIP when an incoming packet has a header containing the OIP as a source and a UDP source port of the connection request packet. A second rule can be configured to change a source address from DIP to VIP for an outgoing packet before encapsulating the outgoing packet with an outer header having the DIP as a source address when an outgoing packet has a header containing the OIP as a destination and the UDP source port of the connection request packet. A third rule can be configured to perform cyclic redundancy check ("CRC") on the received/transmitted packets as well as updating corresponding CRC values associated with the packets subsequent to processing the packet according to the rules.

The host agent can also forward the processed connection request packet to a NIC of the destination server to generate a connection reply packet according to an RDMA protocol. In this case, as the destination address in the connection request packet is that of the destination server, not the VIP, the NIC-generated reply packet contains the source address set to the DIP. Once generated, the NIC forwards the connection reply packet to the host agent (e.g., the hypervisor) which can change the source IP address from the DIP to the VIP, change the IP address in an RDMA header, and send the changed connection reply packet to the packet handler, which than encapsulates the connection reply packet with the destination address set to the OIP. Subsequently, the packet handler can transmit the processed connection reply packet directly to the originating node via the computer network, and thus bypassing the load balancer.

Upon receiving the connection reply packet from the destination server, a packet handler associated with the originating node can forward the received connection reply packet to a host agent for processing. The host agent can then remove the outer header from the received connection reply packet and perform other suitable modifications on the connection reply packet. The host agent can then generate and configure one or more rules for the packet handler of the originating node for establishing an RDMA connection with the destination server. For instance, a first rule can be configured to decapsulate an incoming packet when a header of the incoming header containing a destination address containing the OIP and the UDP source port as specified in the connection reply packet. A second rule can be configured to encapsulate an outgoing packet with an outer header having the DIP as a destination address when an inner header contains OIP as a source address and the UDP source port as specified in the connection reply packet. The host agent can also forward the processed connection reply packet to a NIC of the originating node to generate a packet indicating that an RDMA connection with the destination server is ready to use. The NIC can then forward the ready-to-use packet to the packet handler to be processed according to the newly configured rules before transmitting the packet directly to the destination server via the computer network.

Once the RDMA connection is established, in certain implementations, traffic between the originating node and destination server can be efficiently processed by the NIC and the packet handlers with the corresponding configured rules without using any software processing. For example, when the originating node transmits a data packet to the destination server, the packet handler at the originating node can encapsulate the packet with an outer header having the DIP as a destination address instead of the VIP. As such, the computer network can readily forward the data packet directly to the destination server instead of the load balancer associated with the VIP. Once received, the packet hander at the destination server can decapsulate the data packet and change the destination address of the inner header from the VIP to the DIP before forwarding the data packet to the NIC of the destination server for RDMA operations. In other embodiments, processing based on the configured rules can also be at least partially implemented in software executed by, for instance, the NIC or the host agent.

Several embodiments of the disclosed technology can achieve low latency, high scalability, high availability, and low cost for implementing load balancers in RDMA traffic. As described above, the load balancer according to the foregoing technique only handles the first packet for traffic associated with an RDMA connection. As such, the load balancer can be highly available and can be readily scaled up or down depending on traffic loads. Also, the load balancer can be implemented with generic computing devices without requiring customized applications or components. As such, high capital cost for implementing the load balancer can be avoided. In addition, the packet handler at the servers can be implemented in hardware to reduce processor usage at the servers and can reduce latency when processing packets in hardware at the servers.

DETAILED DESCRIPTION

Figure 1:
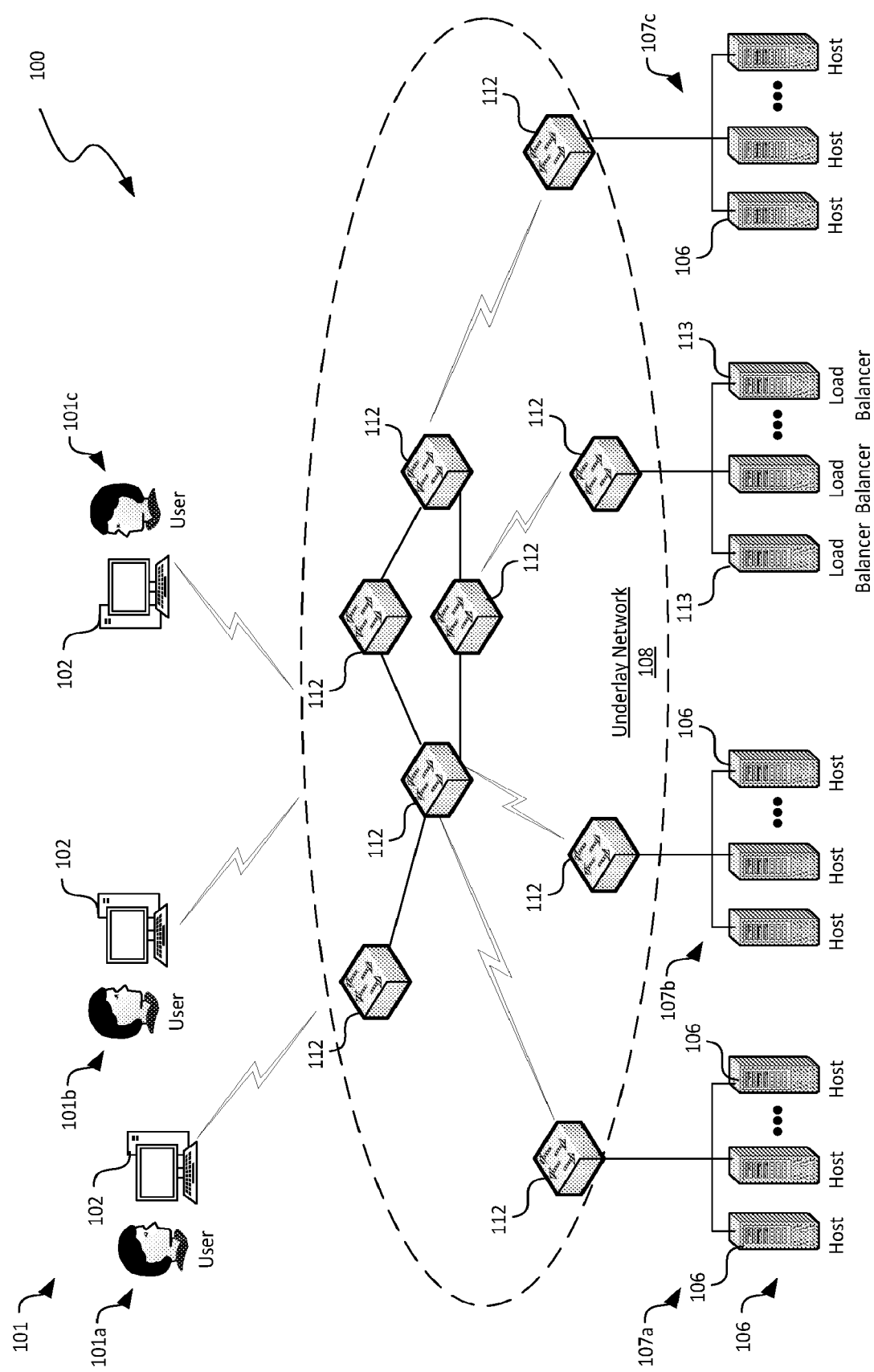
FIG. 1 is a schematic diagram of a distributed computing system implementing load balancing techniques in accordance with embodiments of the disclosed technology.

Certain embodiments of computing systems, devices, components, modules, routines, and processes for facilitating load balancing in RDMA traffic in a distributed computing system are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-10.

As used herein, the term a "distributed computing system" generally refers to a computer network having a plurality of network devices that interconnect a plurality of servers or hosts to one another or to external networks (e.g., the Internet). The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different hosts. Virtual network devices in the overlay network can be connected to one another by virtual links individually corresponding to one or more network routes along one or more physical network devices in the underlay network.

As used herein, a "packet" generally refers to a formatted unit of data carried by a packet-switched network. A packet typically can include user data (or "payload") along with control data. The control data can provide information for delivering the payload. For example, the control data can include source and destination network addresses/ports, error checking codes, sequencing information, hop counts, priority information, or other suitable information regarding the payload. Typically, the control data can be contained in headers and/or trailers of a packet. The headers and trailers can include one or more data field containing suitable information. An example schema for control data is described in more detail below with reference to FIGS. 4A-5D.

Also used herein, remote direct memory access ("RDMA") generally refers to a technique that allows a computer to directly access memory of a remote computer via a computer network without involving either one's operating system. For example, the remote computer can receive certain RDMA messages via computer network. The RDMA message can request read, write, erase, or other suitable memory operations in the remote computer. Without involving the operating system in the remote computer, a network interface card ("NIC") or other suitable components of the remote computer can directly access the memory in the remote computer in accordance with the RDMA messages.

A load balancer is a computing component configured to distribute workloads across multiple computers, computer clusters, network links, central processing units, disk drives, or other suitable types of computing resources. In certain embodiments, a load balancer can include a hardware computing device (e.g., a server) and/or a switch configured with instructions to distribute workload across computing resources randomly or in other suitable manners. In other embodiments, a load balancer can also include computing service provided by a server in a distributed computing system. In further embodiments, a load balancer can also include a hybrid hardware/software device or have other suitable configurations.

In addition, as used herein a "packet handler" can include a hardware, software, or hybrid hardware/software component configured to modify control data of incoming or outgoing packets at a computer. In certain implementations, a packet handler can include programmable hardware circuitry configurable by a host (e.g., an operating system, a hypervisor, a virtual machine, or an application) to enforce certain rules on incoming/outgoing packets. Suitable hardware circuitry can include field programmable gate array ("FPGA"), application specific integrated circuitry ("ASIC"), a co-processor, a hardware accelerator, or other suitable hardware components. In certain embodiments, the packet handler can be incorporated into a NIC. In other embodiments, the packet handler can be a standalone component or incorporated into a chipset containing a main processor, a co-processor, or other suitable components. In further implementations, the packet handler can be implemented as a software component (e.g., as a part of a hypervisor or operating system), a hybrid hardware/software component, or can have other suitable configurations.

Further, a "packet processing rule" or "rule" as used herein generally refers to instructions on processing incoming/outgoing packets when control data in the packets matches certain conditions. In one example, a rule can instruct a processing component (e.g., a packet handler) to encapsulate an outgoing packet with an outer header when the outgoing packet has a header containing certain destination addressed. In another example, a rule can also instruct a processing component to decapsulate an incoming packet when the incoming packet has a header containing certain source addresses. Additional example rules are described below with reference to FIGS. 4A-5D.

Certain techniques for performing load balancing in TCP/IP networks may be unsuitable for load balancing of RDMA traffic. For example, in certain load balancing implementations, a load balancer can be implemented using a scale-out design using commodity servers. During operation, routers or switches in a TCP-IP network can forward packets to one or more load balancers. The load balancers randomly select an end point (e.g., a virtual machine), encapsulates the packets with an IP address of the virtual machine, and forwards the encapsulated packets to a server hosting the virtual machine. At the server, a host agent (e.g., a hypervisor or operating system) decapsulates the packets, performs network address translation, and forwards the packets to the virtual machine.

The foregoing technique may be unsuitable for handling RDMA traffic. In one aspect, latency and processor usage can be high because the host agent processes all packets in software. In another aspect, packet processing at the load balancer can also inflate latency or results in packet loss and/or congestion because all incoming traffic is processed in software, which can be inadequate in processing the packets at sufficient rates to keep up with arriving packets. As such, long queueing delays and packet drops may result, which can be harmful to RDMA traffic. In addition, RDMA semantics differ significantly from TCP/IP semantics. As such, parsing and translating RDMA semantics into TCP/IP semantics can further exasperate the foregoing drawbacks.

Several embodiments of the disclosed technology are directed to an RDMA load balancing technique that can address at least some of the foregoing challenges when utilizing load balancers in handling RDMA traffic. In one aspect, a packet handler (e.g., a FPGA) can be incorporated into servers for processing incoming/outgoing packets according to rules. The rules can be configurable by a host in the servers for performing network address translation, packet encapsulation/decapsulation, termination signaling, or other suitable operations. In another aspect, RDMA connections and associated packets can be identified using UDP source IP addresses and/or source port identifiers. In a further aspect, load balancers can be configured to process only one packet from an originating server requesting an RDMA connection while additional packets are handled directly between the originating server and a destination server selected by the load balancer. As such, embodiments of the disclosed technology can facilitate RDMA traffic with low latency, low processor usage, high availability and scalability, and low cost, as described in more detail below with reference to FIGS. 1-10.

FIG. 1 is a schematic diagram illustrating a distributed computing system 100 suitable for implementing load balancing techniques in accordance with embodiments of the disclosed technology. As shown in FIG. 1, the distributed computing system 100 can include an underlay network 108 interconnecting a plurality of hosts 106, one or more load balancers 113, and a plurality of client devices 102. The individual client devices 102 can be associated with corresponding users 101a-101c. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The hosts 106 can individually be configured to provide computing, storage, and/or other suitable cloud services to the individual users 101. For example, as described in more detail below with reference to FIG. 2, each of the hosts 106 can initiate and maintain one or more virtual machines 144 (shown in FIG. 2) upon requests from the users 101. The users 101 can then utilize the instantiated virtual machines 144 to perform computation, communication, data storage, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the individual users 101a-101c.

As shown in FIG. 1, the underlay network 108 can include multiple network devices 112 that interconnect the multiple hosts 106 and the client devices 102. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is coupled to corresponding network devices 112a-112c, respectively, which are commonly referred to as "top-of-rack" or "TOR" network devices. The TOR network devices 112a-112c can then be coupled to additional network devices 112 to form a computer network in a hierarchical, flat, mesh, or other suitable types of topology. The underlay network 108 can allow communications among the hosts 106 and the client devices 102. In other embodiments, the multiple host sets 107a-107c can share a single network device 112 or can have other suitable arrangements.

The load balancers 113 can be configured to distribute workloads among the hosts 106. For example, the load balancers 113 can distribute RDMA traffic directed to a virtual network address to one or more of the hosts 106 based on current workloads, processing characteristics, or other suitable profiles of the hosts 106, as described in more detail below with reference to FIGS. 4A-5D. In the illustrated embodiment, two load balancers 113 are shown for illustration purposes. In other embodiments, the distributed computing system 100 can include a single load balancer, three, four, or any suitable number of load balancers 113 operating in parallel, in tandem, or in other suitable manners. In certain embodiments, the load balancers 113 can be individually implemented using one or more commodity servers and can operate in parallel. As such, by using multiple load balancers 113 (or load balancer instances), the load balancers 113 can provide higher failure resiliency as many other load balancers 113 are available to handle traffic when one fails. Example embodiments of the load balancer 113 are described in more detail below with reference to FIG. 3.

Figure 2:
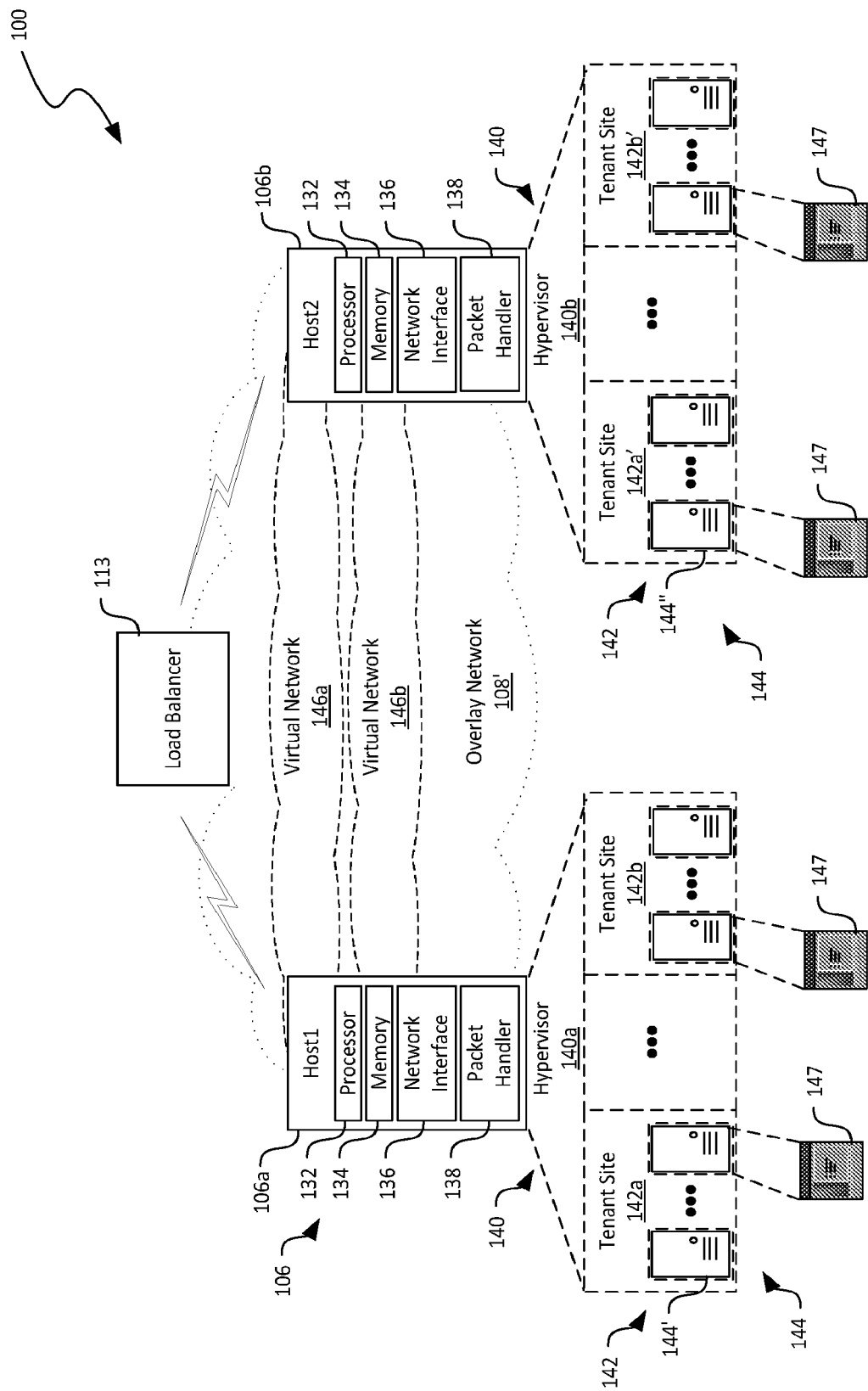
FIG. 2 is a schematic diagram illustrating certain hardware/software components of the distributed computing system in FIG. 1 in accordance with embodiments of the disclosed technology.

As shown in FIG. 2, the first host 106a (shown in FIG. 2 as "Host1") and the second host 106b (shown in FIG. 2 as "Host2") can each include a processor 132, a memory 134, a network interface 136, and a packet handler 138 operatively coupled to one another. The processor 132 can include one or more microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 6A-10).

The network interface 136 can include a NIC, a connection converter, and/or other suitable types of input/output devices configured to accept input from and provide output to other components on the virtual networks 146.

As shown in FIG. 2, the first host 106a (shown in FIG. 2 as "Host1") and the second host 106b (shown in FIG. 2 as "Host2") can each include a processor 132, a memory 134, an network interface 136, and a packet handler 138 operatively coupled to one another. The processor 132 can include one or more microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 6A-10). The network interface 136 can include a NIC, a connection converter, and/or other suitable types of input/output devices configured to accept input from and provide output to other components on the virtual networks 146.

The first host 106a and the second host 106b can individually contain instructions in the memory 134 executable by the processors 132 to cause the individual processors 132 to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can also include firmware and/or hardware components.

The tenant sites 142 can each include multiple virtual machines 144 for executing suitable tenant applications 147 of a particular tenant 101 (FIG. 1). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or suitable applications. The executed applications can each correspond to one or more cloud computing services or other suitable types of computing services.

Also shown in FIG. 2, the distributed computing system 100 can include an overlay network 108' having one or more virtual networks 146 that interconnect the tenant sites 142a and 142b across the first and second hosts 106a and 106b. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146 or the load balancers 113 (FIG. 1). Thus, different virtual networks 146 can use one or more virtual network addresses that are the same. Example virtual network addresses can include IP addresses, MAC addresses, and/or other suitable addresses.

The packet handlers 138 can be configured to process incoming/outgoing packets according to packet processing rules configured by a host agent (e.g., the hypervisor 140 or an operating system) on the hosts 106a and 106b. In the illustrated embodiment, the packet handlers 138 are shown as hardware components of the hosts 106. In other embodiments, the packet handlers 138 can also be a hardware component of the network interface 136, the processor 134, or other suitable components of the hosts 106. In further embodiments, the packet handlers 138 can also include software components executed by the corresponding processors 132. Configuration and operations of the packet handlers 138 are described in more detail below with reference to FIGS. 4A-5D.

In operation, the hosts 106 can facilitate communications among the virtual machines and/or tenant applications 147 executing in the virtual machines 144. For example, the processor 132 can execute suitable network communication operations to facilitate the first virtual machine 144' to transmit packets to the second virtual machine 144" or the second host 106b via the virtual network 146a by traversing the network interface 136 on the first host 106a, the underlay network 108 (FIG. 1), and the network interface 136 on the second host 106b. In accordance with embodiments of the disclosed technology, the packet handlers 138 can be configured to facilitate operations of the load balancer 113 in distributing RDMA traffic in the distributed computing system 100, as described in more detail below with reference to FIGS. 4A-5D.

Figure 3:
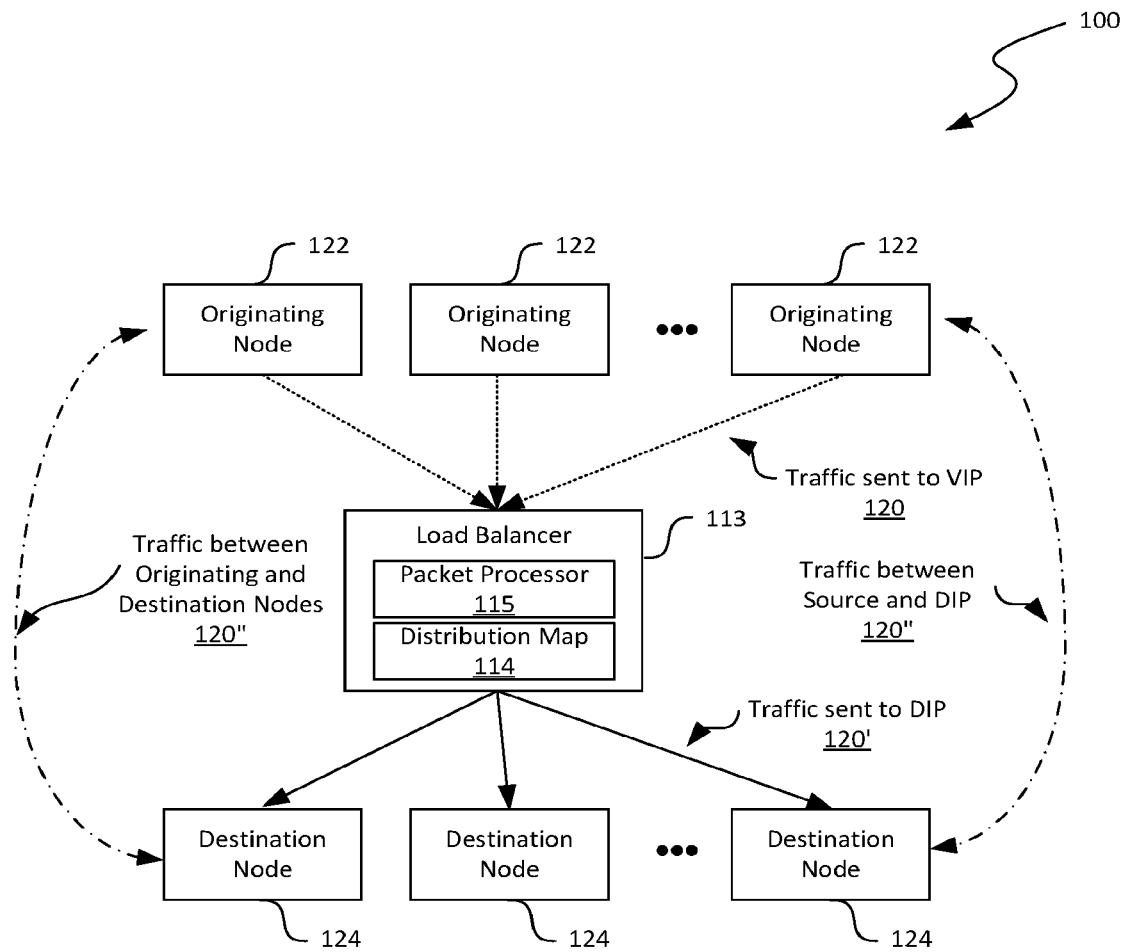
FIG. 3 is a schematic diagram illustrating communication paths among an originating node, a load balancer, and a destination node in the distributed computing system in FIG. 1 in accordance with embodiments of the disclosed technology.

FIG. 3 is a schematic diagram illustrating communication paths among an originating node, a load balancer, and a destination node in the distributed computing system in FIG. 1 in accordance with embodiments of the disclosed technology. In FIG. 3, only one load balancer 113 is shown for illustration purposes. In other embodiments, multiple load balancers 113 can be implemented to interact with the originating and destination nodes. As shown in FIG. 3, the distributed computing system 100 can include a load balancer 133 interposed between multiple originating nodes 122 and destination nodes 124. The individual originating node 122 can include a host 106 (FIGS. 1 and 2), a hypervisor 140 (FIG. 2) on a host 106, a virtual machine 144 (FIG. 2) managed by a hypervisor 140 on a host 106, or an application 147 (FIG. 2) executing in a virtual machine 144. The individual destination node 124 can include additional hosts 106 selectable by the load balancer 113 to server RDMA requests from the originating node 122.

As shown in FIG. 3, the load balancer 113 can be configured to announce to the originating nodes 122 one or more virtual network addresses (e.g., "VIPs") associated with destinations for serving RDMA requests. The originating nodes 122 can each have an originator network address (e.g., "OIP") while the destination nodes 124 each have a direct network address (e.g., "DIP"). The load balancer 113 can also containing, for example, in a computer readable storage medium or otherwise have access to a distribution map 114. By consulting the distribution map 114, the load balancer 113 can be configured to assign a destination node 124 to serve an RDMA request transmitted to a VIP, as described in more detail below.

As shown in FIG. 3, the load balancer 113 can include a packet processor 115 operatively coupled or otherwise has access to the distribution map 114. The packet processor 115 can be configured to process at least a request packet from one of the originating nodes 122 and distribute associated workload to one or more destination nodes 124 by consulting the distribution map 114. In certain embodiments, an originating node 122 can transmit a request packet for establishing an RDMA connection to a VIP announced by the load balancer 113. As such, the underlay and/or overlay network 108 and 108' (FIGS. 1 and 2) can forward the request packet to the load balancer 113 based on the VIP, as part of traffic sent to VIP 120.

Upon receiving the request packet, the packet processor 115 can be configured to select one or more of the destination node 124 by consulting the distribution map 114 based on, for example, the VIP, a UDP source address and source port associated with the request packet. In one embodiment, the load balancer 113 can be configured to calculate a hash value of the VIP, the UDP source address and source port and select a destination node 124 based thereon. In other embodiments, the load balancer 113 can also select the destination node 124 based on current traffic conditions, operating status of the destination nodes 124, or other suitable criteria.

Once the destination node 124 is determined, the packet processor 115 can be configured to encapsulate the request packet with an outer header having a destination field containing a DIP associated with the selected destination node 124. The load balancer 113 can then forward the encapsulated request packet to the destination node 124 via the underlay and/or overlay network 108 and 108', as a part of traffic sent to DIP 120'. Upon receiving the request packet from the load balancer 113, the destination node 124 can process the request packet and initiate communications with the originating node 122 directly to establish, communicate, and eventually dismantle the RDMA connection, as a part of the traffic between the originating and destination nodes 120". Details of interactions between the originating and destination nodes 122 and 124 are described below with reference to FIGS. 4A-5D.

As described above, in certain embodiments, the only operation the load balancer 113 is involved in for establishing the requested RDMA connection is to process the first packet (i.e., the request packet) for establishing the RDMA connection. Once such processing is completed, the load balancer 113 may not be involved in establishing, facilitating communications via the RDMA connection, or dismantling the RDMA connection. In other embodiments, the load balancer 113 can be configured to monitor, report, or perform other suitable operations related to the RDMA connection. As such, the load balancer 113 can have reduced workload for distributing RDMA requests among the destination nodes. Thus, high scalability in the load balancer 113 may be readily achieved. In addition, suitable computing devices for implementing the load balancer 113 can include generic servers with suitable instructions. As such, the capital costs related to the load balancer 113 can be low. Additionally, several embodiments of the disclose technology also provide high availability because the load balancer 113 only handles the first packet for a corresponding RDMA connection. Subsequent packets via the RDMA connection are transmitted directly between an originating node 122 and a destination node 124.

FIG. 4A-4E are schematic diagrams illustrating certain hardware/software components of the distributed computing system 100 in FIG. 1 during certain stages of establishing an RDMA connection between an originating node and a destination node. In FIGS. 4A-5D, only certain components of the distributed computing system 100 of FIG. 1 are shown for clarity. Also, in FIGS. 4A-5D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit, or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As described above, an originating node 122 can include a host 106, a hypervisor 140, a virtual machine 144, or an application 147 executing in a virtual machine 144. In the following description, an application 147 is used as an example originating node 122 to illustrate various aspects of the technology. Other types of originating nodes 122 may have general similar functionalities and/or operations.

Figure 4A:
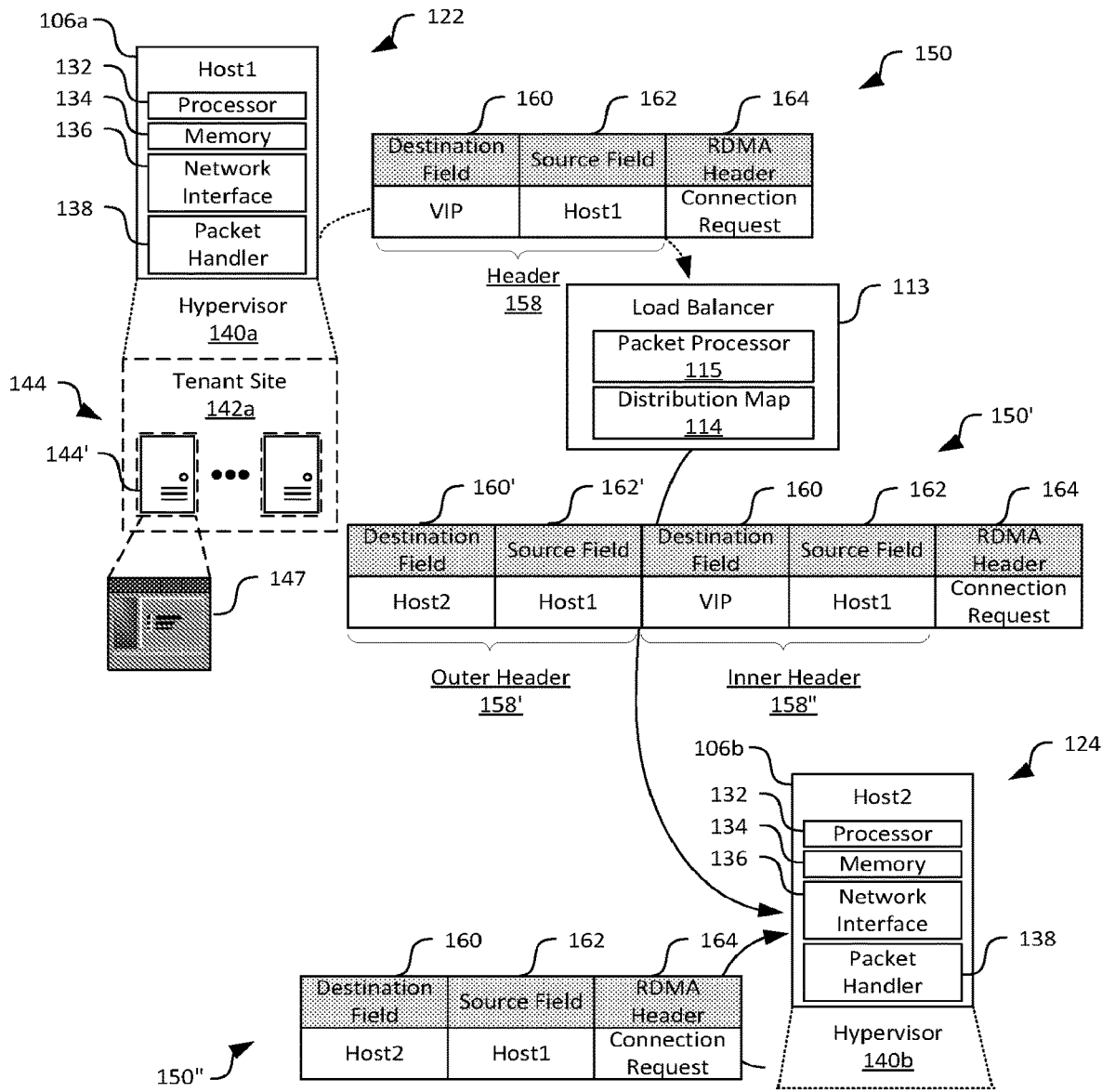
FIG. 4A-4E are schematic diagrams illustrating certain hardware/software components of the distributed computing system in FIG. 1 during certain stages of establishing an RDMA connection between an originating node and a destination node.

As shown in FIG. 4A, the application 147 executing in the virtual machine 144' on the first host 106a can initiate a request for establishing an RDMA connection with a target associated with a VIP. With facilitation by the hypervisor 140a, the network interface 136, and or other components of first host 106a, the packet handler 138 can transmit a request packet 150 to a target associated with the VIP via the underlay and/or overlay network 108 and 108' (FIGS. 1 and 2). As shown in FIG. 4A, the request packet 150 can include a header 158 having a destination field 160 and a source field 162 and a RDMA header 164, for example, containing operation codes corresponding to operations of RDMA write, RDMA read, RDMA read response, send, send with invalidate, or terminate. In the illustrated example, the destination field 160 can contain the VIP; the source field 162 contains a network address of the first host 106a (shown as "Host1"); and the RDMA header 164 can include a connection request for establishing an RDMA connection.

The network devices 112 (FIG. 1) in the underlay network 108 (FIG. 1) can then forward the request packet 150 to one of the load balancers 113. Upon receiving the request packet 150, the load balancer 113 can select one of the other hosts 106 to serve the requested RDMA connection. In the illustrated example, the load balancer 113 selects the second host 106b as a destination node 124 to serve the requested RDMA connection by, for example, consulting the distribution map 114. As such, the packet processor 115 can encapsulate the request packet 150 with an outer header 158' while the original header 158 becomes an inner header 158". As shown in FIG. 4A, the outer header 158' can also include a destination field 160' containing a network address of the second host 106b (shown as "Host2") and a source field 162' containing the network address of the first host 106a (shown as "Host1").

The load balancer 113 can then forward the encapsulated request packet 150' to the second host 106b according to the network addressed contained in the destination field 160' and the source field 162' in the outer header 158'. Upon receiving the encapsulated request packet 150', the packet handler 138 can, by default, forward the received encapsulated request packet 150' via the network interface 136 to a host agent for further processing. In the illustrated example herein, the hypervisor 140 is used as an example host agent in the hosts 106. In other embodiments, the host agent can also include an operating system, a standalone application, or other suitable components on the hosts 106. Upon receiving the encapsulated request packet 150', the hypervisor 140b can be configured to remove the outer header 158', change the destination IP of the inner header 158" from VIP to DIP, and make other suitable packet modifications (e.g., updating error checking values, etc.). To comply with RDMA standard, the hypervisor 140b can also change the IP address in the RDMA header 164 from VIP to DIP. The hypervisor 140b can then forward the processed request packet 150" to the network interface 136 for generating a replay packet based on the connection request contained in the RDMA header 164 for an RDMA connection between the first host 106a and the VIP.

Figure 4B:
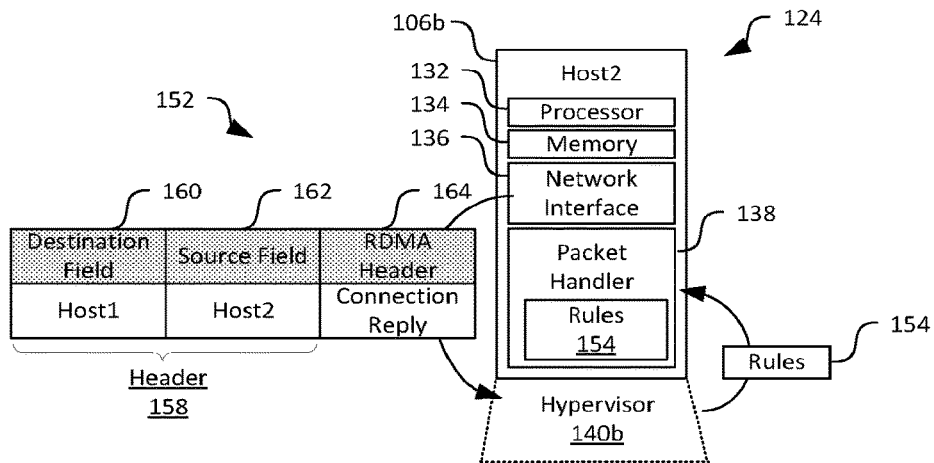

As shown in FIG. 4B, the hypervisor 140b can also generate and configure one or more rules 154 enforceable by the packet handler 138. In certain embodiments, the rules 154 are enforceable by the packet handler 138 to modify values in one or more fields in a header of packets exchanged between the first and second hosts 106a and 106b. The following are two example rules 154 for processing incoming and outgoing packets at the second host 106b.
For Outgoing Packets
  If a destination field 160 contains "Host1" and a UDP source port field contains a port of the first host 106a (e.g., "Port1"), then change the value in a source field 162 to "VIP" and encapsulate the packet with an outer header having a destination field 160' containing "Host1" and a source field 162' containing "Host2."
For Incoming Packets
  If a source field 162 contains "Host1" and a UDP source port field contains "Port1", then decapsulate the packet by removing the outer header 158" and change the value in a destination field 160 of the inner header to "Host2."

In other embodiments, the rules 154 are enforceable by the packet handler 138 to update error checking codes or perform other suitable packet operations. For example, once the packet is encapsulated or decapsulated and values in certain fields are modified, a rule 154 can instruct the packet handler 138 to update an error checking code of the packet, for example, an ICRC in the RDMA header 164. In further embodiments, the network interface 136 may be instructed to ignore error checking codes for packets received from the packet handler 138. Operations associated with the rules 154 are described in more detail below with reference to FIGS. 4C-5D. As shown in FIG. 4A, the hypervisor 140b can transmit the request packet 150" to the network interface 136 after removing the outer header 158' and changing the destination IP to DIP. In certain computing systems, the request packet 150" is transmitted to the network interface 136 via the packet handler 138. In other embodiments, the request packet 150" may be transmitted to the network interface 136 directly or in other suitable manners.

Also shown in FIG. 4B, the network interface 136 can be configured to generate a reply packet 152 in response to the request packet 150". In the illustrated example, the reply packet 152 can include a header 158 with a destination field 160 containing "Host1" and a source field 162 containing "Host2." The reply packet 152 also includes a RDMA header 164 containing a connection reply with information suitable for establishing the requested RDMA connection. In other examples, the reply packet 152 can also include additional header fields, trailers, or other suitable components.

Figure 4C:
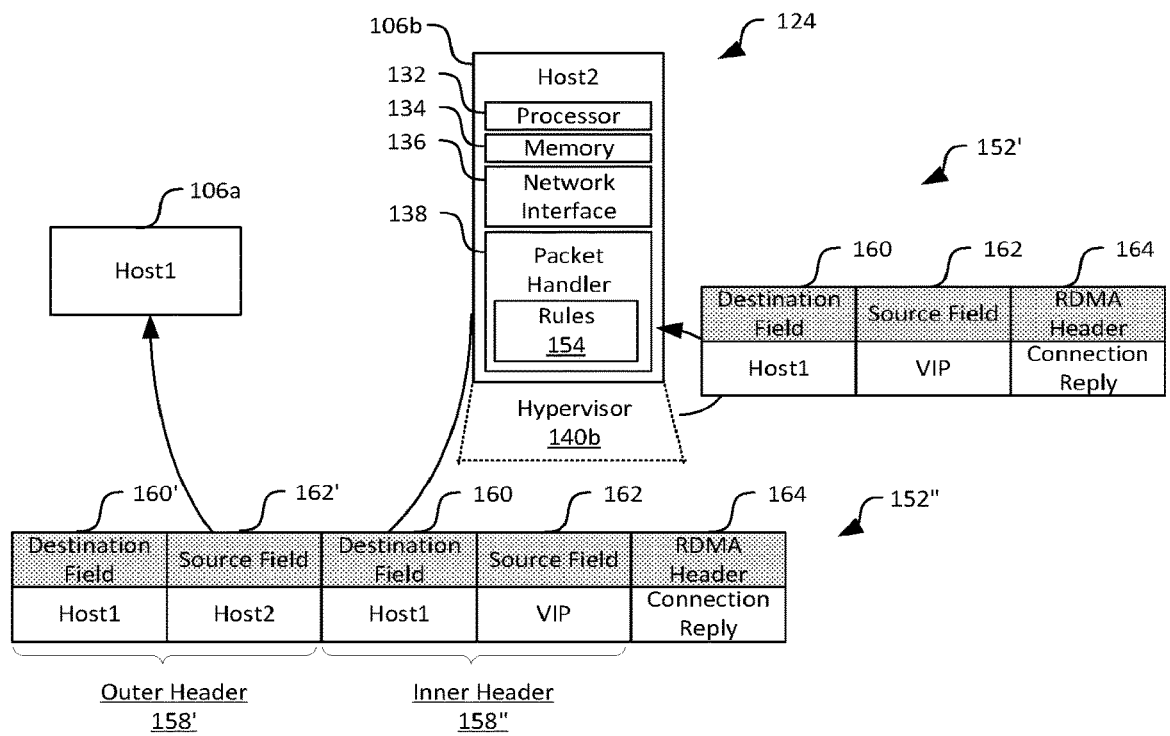

As illustrated in FIG. 4B, the reply packet 152 is directed to an RDMA connection between the first and second hosts 106a and 106b as opposed to between the first host 106a and the VIP. For correct RDMA connection establishment, the source address in the reply packet may be changed from "Host2" to "VIP." As such, in certain embodiments, the reply packet 152 is transmitted from the network interface 136 to the hypervisor 140b, which can be configured to perform network address translation, as shown in FIG. 4C. For example, the hypervisor 140b can be configured to modify the value in the source field 162 in the replay packet 152 from "Host 2" to "VIP." In other embodiments, such modifications may also be performed by the packet handler 138 or other suitable components. Additionally, to comply with RDMA standard, the hypervisor 140b can also modify the IP address in the RDMA header 164 to VIP. Once modified, the hypervisor 140b can forward the modified reply packet 152' to the packet handler 138 to be processed according to the rules 154. For example, as shown in FIG. 4C, the packet handler 138 can encapsulate the reply packet 152' with an outer header 158' having a destination field 160' containing "Host1" and a source field 162' containing "Host2," as set out in the example rules 154 above. Subsequently, the packet handler 138 can transmit the encapsulated reply packet 152" to the first host 106a to establish the requested RDMA connection.

Figure 4D:
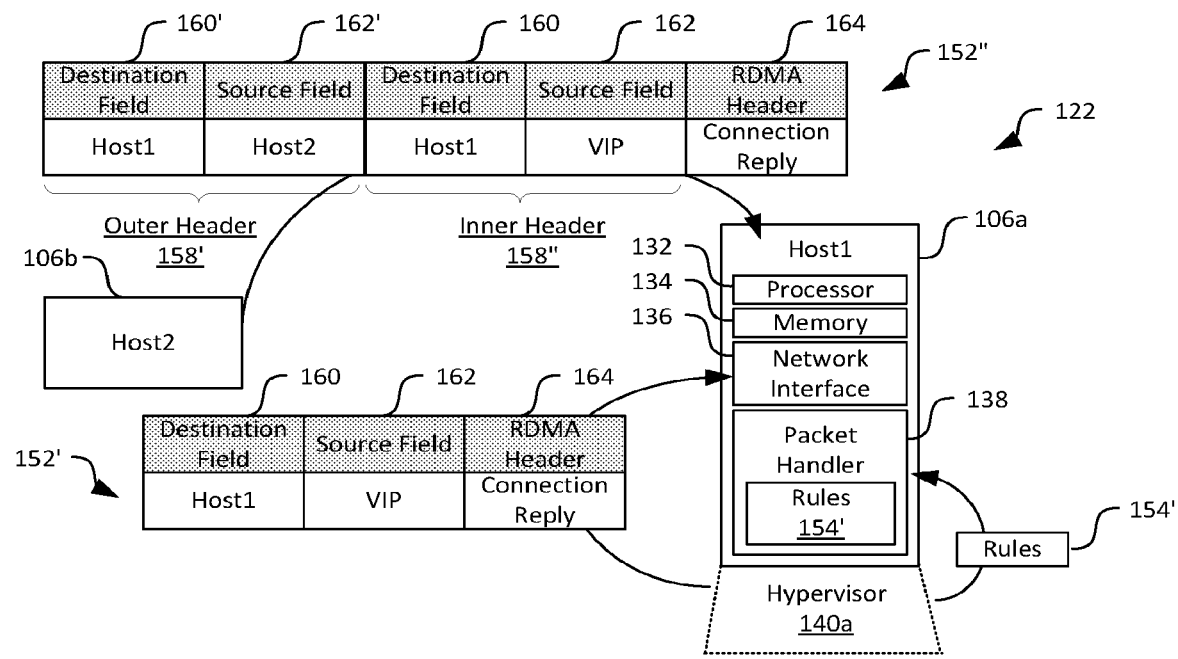

As shown in FIG. 4D, upon receiving the encapsulated reply packet 152", the packet handler 138 at the first host 106a can forward the received packet 152" to the hypervisor 140a. The hypervisor 140a can then decapsulate the packet 152" by removing the outer header 158" and make other suitable modifications. The hypervisor 140a can then forward the replay packet 152' to the network interface 136 for generating a confirmation packet 153 (shown in FIG. 4E).

The hypervisor 140a can also generate and configure one or more rules 154' for the packet handler 138 for processing additional packets exchanged via the requested RDMA connection. The following are two example rules 154 for processing incoming and outgoing packets at the second host 106b.

For Outgoing Packets
If a source field 160 contains "Host1" and a UDP source port field contains "Port1," then encapsulate the packet with an outer header having a destination field 160' containing "Host2" and a source field 162' containing "Host1."

For Incoming Packets
If a destination field 160 contains "Host1" and a UDP source port field contains "Port1", then decapsulate the packet by removing the outer header 158."

In other embodiments, the rules' 154 are enforceable by the packet handler 138 to update error checking codes or perform other suitable packet operations. For example, once the packet is encapsulated or decapsulated and values in certain fields are modified, a rule 154 can instruct the packet handler 138 to update an error checking code of the packet.

Figure 4E:
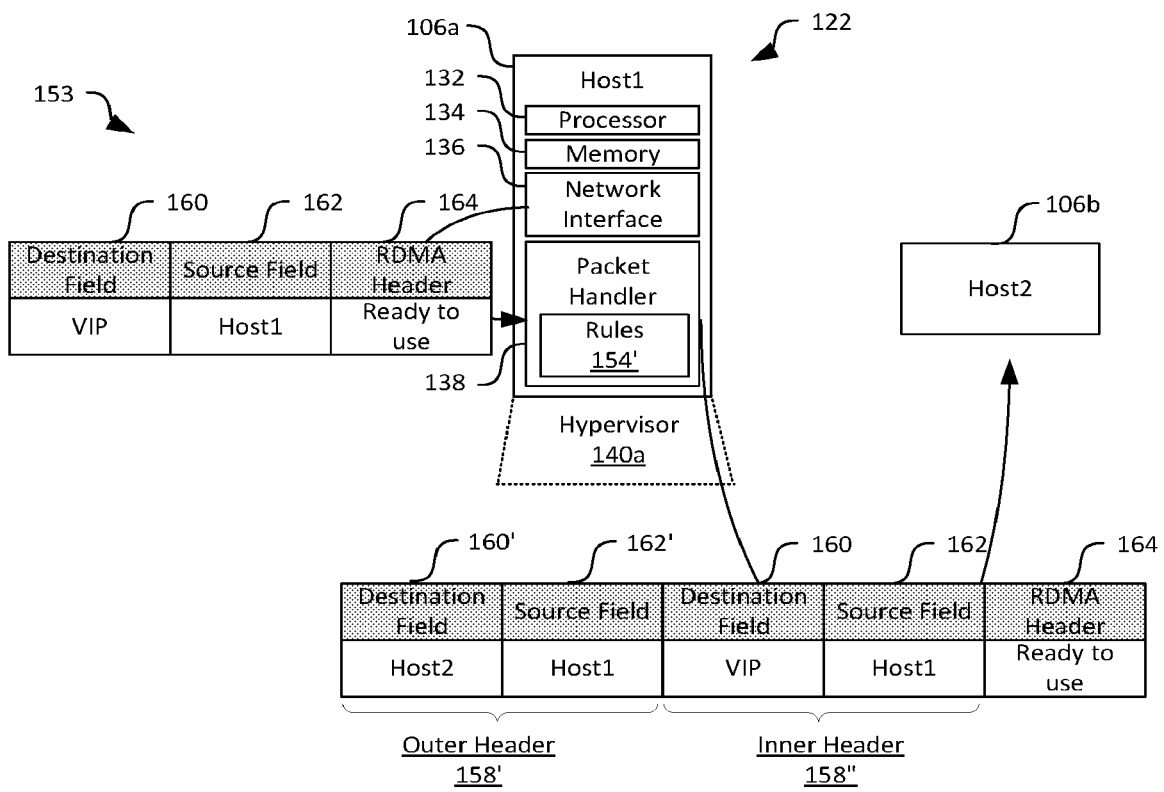

As shown in FIG. 4E, the network interface 136 at the first host 106a can generate a confirmation packet 153 having a header with a destination field 160 containing "VIP," a source field 162 containing "Host1," and a RDMA header 164 containing a message indicating the RDMA connection between "Host1" and "VIP" is ready to use. The packet handler 138 can then process the confirmation packet 153 by, for example, encapsulating the confirmation packet 153 with an outer header 158' having a destination field 160' containing "Host2" and a source field 162' containing "Host1." The packet hander 138 can then transmit the encapsulated confirmation packet 153' to the second host 106b based on the network addresses in the outer header 158'.

Figure 5A:
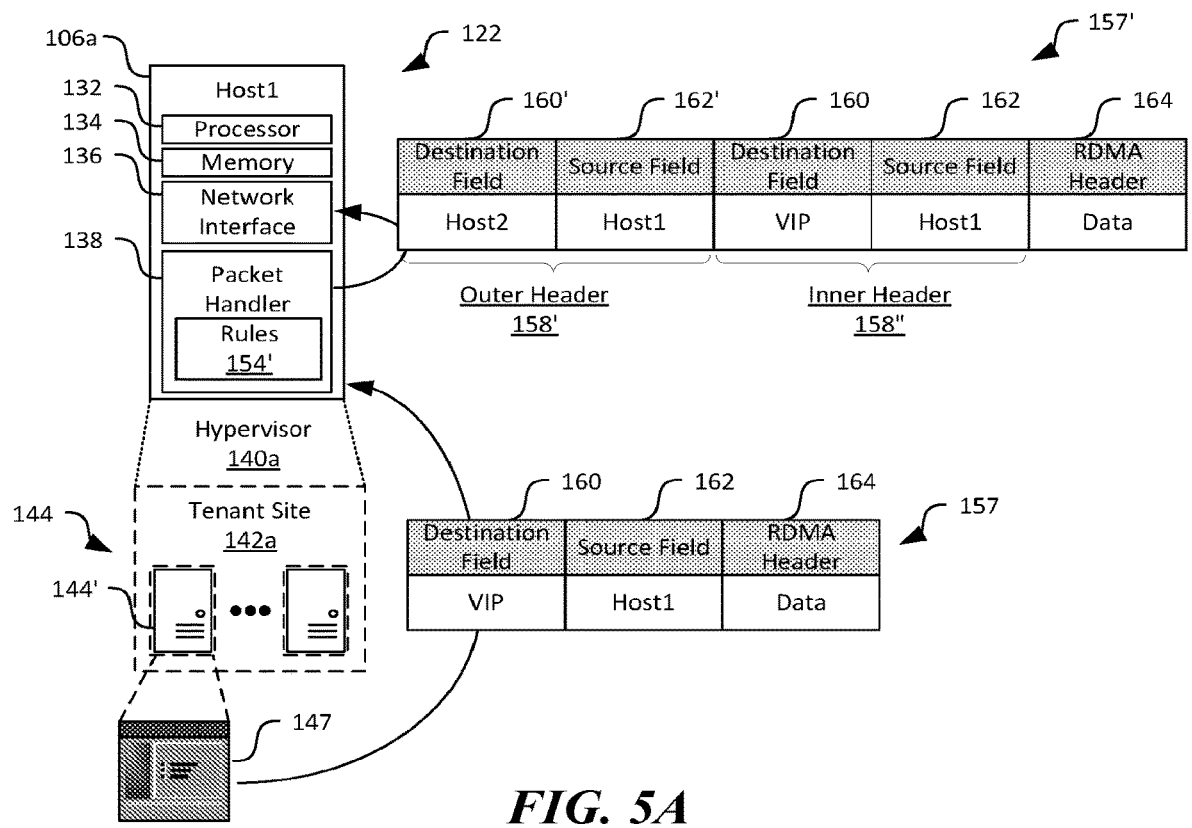
FIG. 5A-5D are schematic diagrams illustrating certain hardware/software components of the distributed computing system in FIG. 1 during certain stages of exchanging data via an RDMA connection between an originating node and a destination node.
Figure 5B:
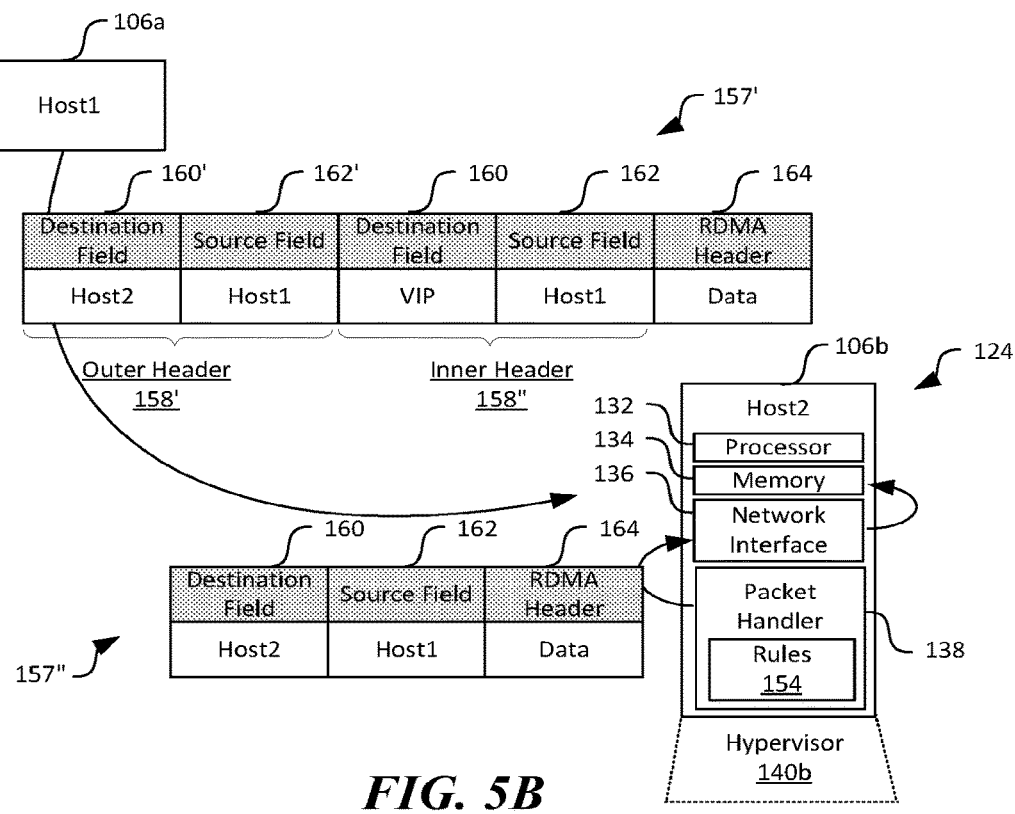

FIG. 5A-5D are schematic diagrams illustrating certain hardware/software components of the distributed computing system 100 in FIG. 1 during certain stages of exchanging data via an RDMA connection between an originating node and a destination node. In particular, FIGS. 5A-5B illustrate operations of packet processing when an originating node (i.e., the first host 106a) transmits a packet 157 to a destination node (i.e., the second host 106b). As shown in FIG. 5A, the application 147 can initiate a data transfer via the RDMA connection by generating a packet 157 having a header with a destination field 160 containing "VIP," a source field 162 containing "Host1," and a RDMA header 164 containing user data. Upon receiving the packet 157, the packet handler 138 can process the packet 157 according to the rules 154', for example, to encapsulate the packet 157 with an outer header 158' with a destination field 160' containing "Host2" and a source field 162' containing "Host1." The packet handler 138 can then forward the encapsulated packet 157' to the second host 106b instead of the load balancer 113 (FIG. 3).

As shown in FIG. 5B, upon receiving the packet 157' from the first host 106a, the packet handler 138 at the second host 106b can process the packet 157' according to the configured rules 154. For example, the packet handler 138 can decapsulate the packet 157' by removing the outer header 158' and modify the destination field 160 of the inner header 158" from "VIP" to "Host2." The packet handler 138 can then forward the modified packet 157" to the network interface 136, which in turn can perform suitable direct memory access to the memory 134 of the second host 106b.

Figure 5C:
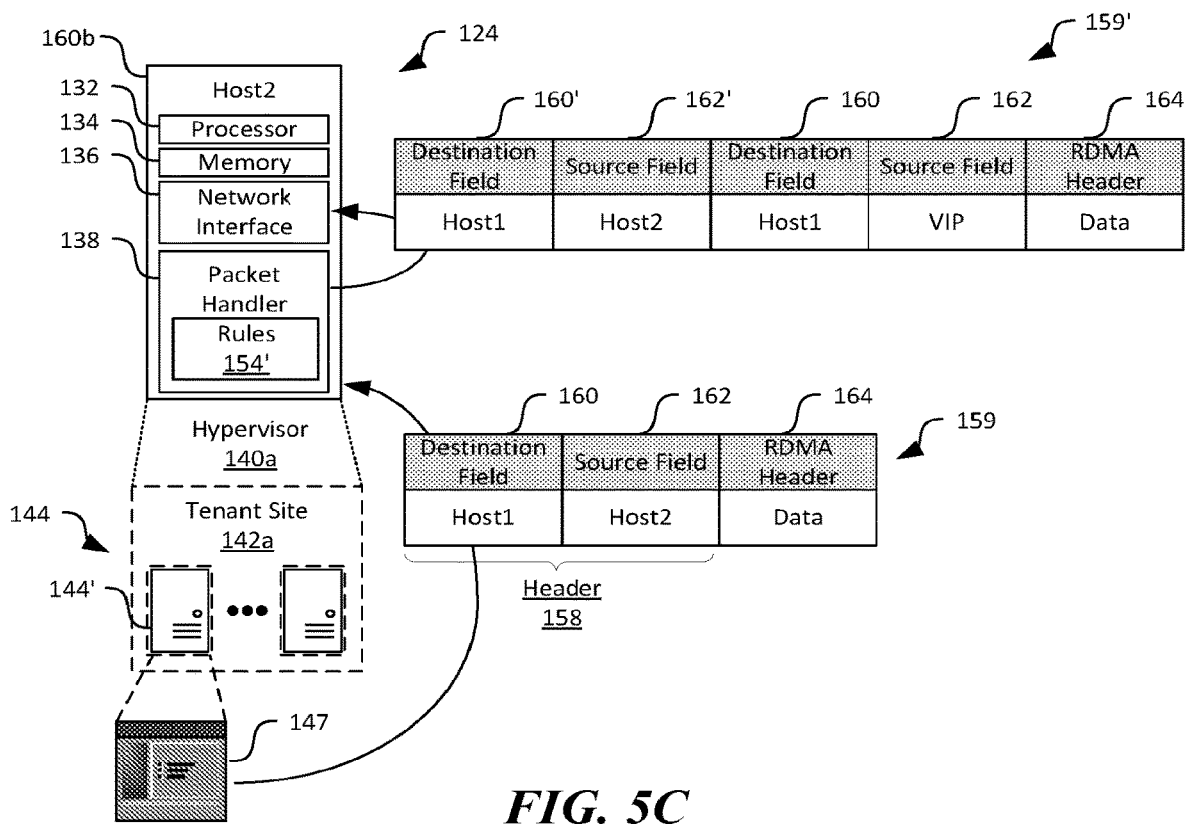
Figure 5D:
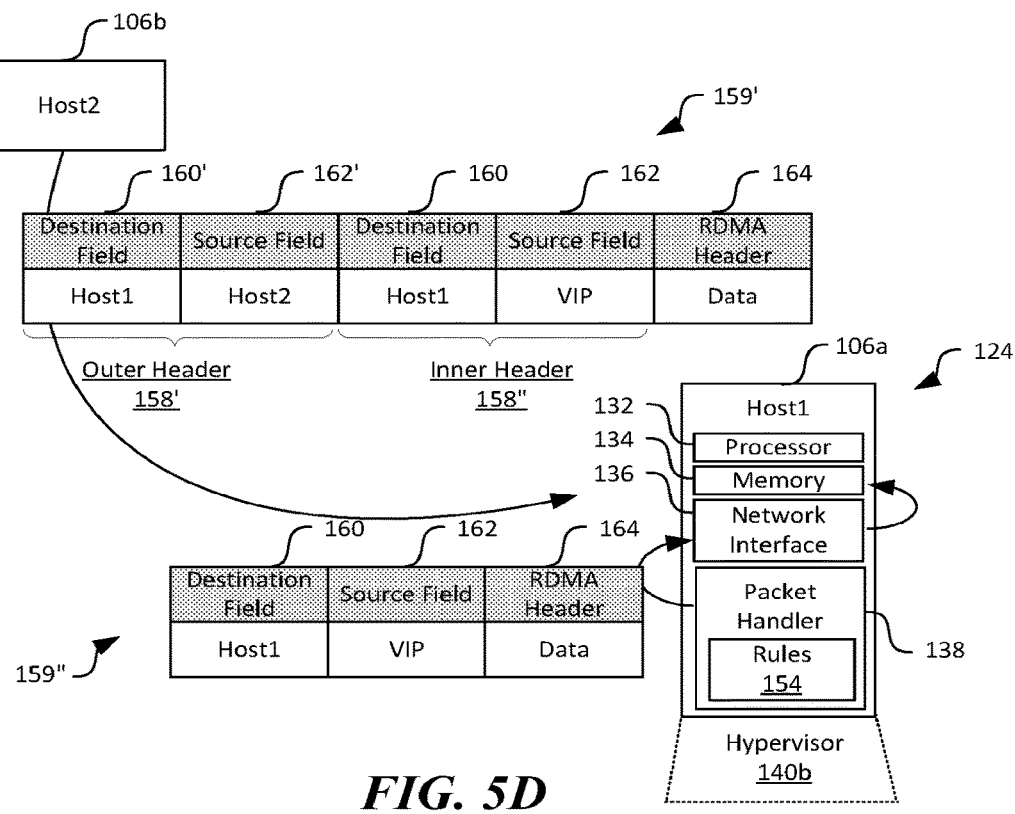

FIGS. 5C and 5D illustrate operations of packet processing when a destination node (i.e., the second host 106a) transmits a packet 157 to an originating node (i.e., the first host 106a). As shown in FIG. 5C, an application 147 or other suitable components in the second host 106b can generate and initiate transmission of a packet 159 via the established RDMA connection. In the illustrated example, the generated packet 159 can include a header 158 having a destination field 160 containing "Host1" and a source field 162 containing "Host2," and a RDMA header 164 containing user data. Upon receiving the packet 159, the packet handler 138 can process the packet 159 according to the configured rules 154'. For example, the packet handler 138 can modify the source field 162 of the header 158 from "Host2" to "VIP" and encapsulate the modified packet 159 with an outer header 158' having a destination field 160' containing "Host1" and a source field 162' containing "Host2." The packet handler 138 can then forward the encapsulated packet 159' to the first host 106a according to the outer header 158' and thus bypassing the load balancer 113 (FIG. 3).

As shown in FIG. 5D, upon receiving the encapsulated packet 159' from the second host 106b, the packet handler 138 can decapsulate the packet 159' according to the rules 154 and forward the decapsulated packet 159" to the network interface 136 for further processing. The network interface 136 can then perform suitable direct memory access operations to the memory 134 of the first host 106a according to the user data contained in the RDMA header 164.

Various techniques may be implemented to dismantle the RDMA connection once communication has ended. For example, in one embodiment, the application 147 and/or the hypervisor 140 can transmit an instruction to the packet handler 138 to remove the configured rules 154. The application 147 and/or the hypervisor 140 can also inform the network interface 136 that the RDMA connection is no longer needed. The network interface 136 in turn can cause the packet handler 138 to remove the rules 154. In other examples, the network interface 136 can also monitor a communication condition via the RDMA connection. If no activity has been detected for a threshold period, the network interface 136 and/or the hypervisor 140 can cause the rules 154 be removed from the packet handler 138. In further examples, the RDMA connection can be dismantled based on an elapsed time, an accumulated data transfer, or other suitable criteria.

Figure 6A:
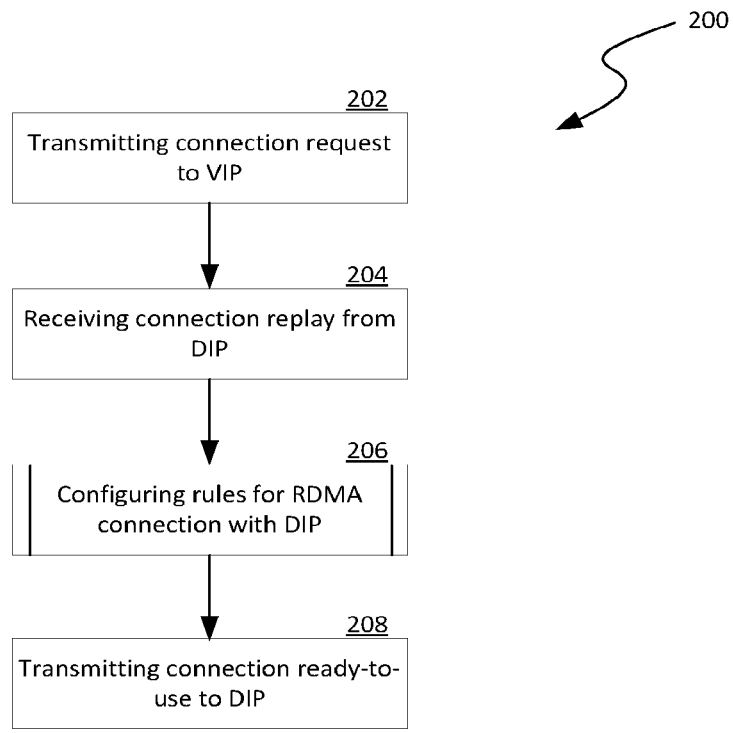
FIGS. 6A-8B are flowcharts illustrating various processes of establishing an RDMA connection between an originating node and a destination node in accordance with embodiments of the disclosed technology.
Figure 6B:
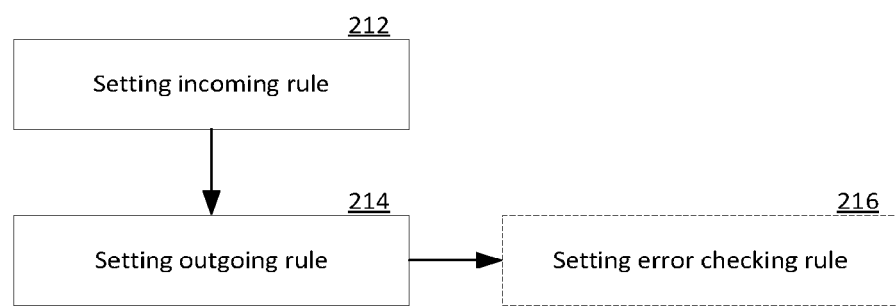

FIGS. 6A-6B are flowcharts illustrating a process 200 of establishing an RDMA connection between an originating node and a destination node in accordance with embodiments of the disclosed technology. Even though embodiments of the process 200 are described below with reference to the distributed computing system 100 of FIG. 1, in other embodiments, the process 200 can also be implemented in computing systems with different and/or additional components.

As shown in FIG. 6A, the process 200 can include transmitting a connection request packet for establishing an RDMA connection with a target associated with a virtual network address (e.g., a virtual IP address or "VIP") at stage 202. In certain embodiments, the VIP is announced by one or more load balancers. As such, the connection request packet can be forwarded by network devices (e.g., routers, switches, etc.) to the load balancer. The process 200 can also include receiving a connection reply packet from a host 106 (FIG. 1) with a destination network address (e.g., a direct IP address or "DIP") at stage 204.

The process 200 can further include configuring one or more rules for handling packets exchanged via the requested RDMA connection with DIP at stage 206. In certain embodiments, the configured rules can be enforceable by a hardware circuitry (e.g., a FPGA). In other embodiments, the rules can be enforceable by a hypervisor, an operating system, or other suitable software components. In further embodiments, the rules can be enforceable by a combination of hardware circuitry and software components. Example operations for configuring the rules are described in more detail below with reference to FIG. 6B. The process 200 can then include transmitting a confirmation packet indicating that the RDMA connection is ready to use to the DIP at stage 208.

FIG. 6B illustrates example operations for configuring rules for handling packets exchanged via the requested RDMA connection. As shown in FIG. 6B, the operations can include setting an incoming rule at stage 212 and outgoing rule at stage 214. Example incoming and outgoing rules are described above with reference to FIGS. 4A-4E. Optionally, the operations can also include setting an error checking rule at stage 216. For example, the error checking rule can include updating an error checking value (e.g., a hash) subsequent to encapsulating or decapsulating an incoming or outgoing packet. In other examples, the error checking rule can also include an indication to a NIC to ignore error checking for certain packets.

Figure 7:
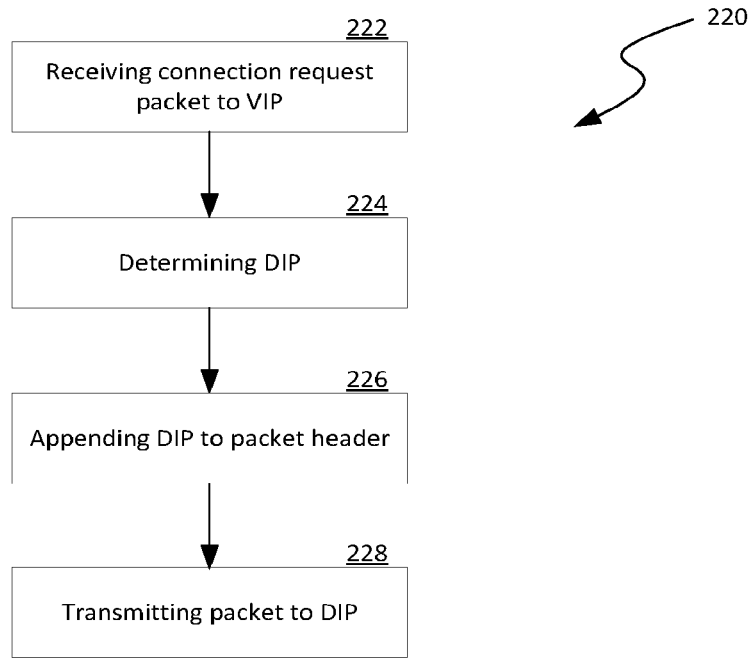

FIG. 7 is a flowchart illustrating a process 220 of performing load balancing in a distributed computing system in accordance with embodiments of the disclosed technology. As shown in FIG. 7, the process 220 can include receiving a connection request packet for establishing an RDMA connection with a target associated at a virtual network address (e.g., a virtual IP or "VIP") from an originating node at stage 222. The process 220 can also include determining a destination node (e.g., a host 106 in FIG. 1) to serve connection request at stage 224. The selected host 106 can have a direct IP address (or "DIP"). Various techniques for determining the DIP can be deployed. In one example, the DIP can be determined based on a hash value or other suitable characteristics of the connection request packet and a distribution map. In other examples, the DIP can be determined based on current workload, processing profiles, or other suitable criteria.

The process 220 can then include appending the determined DIP to a packet header of the connection request packet at stage 226. In one implementation, the DIP can be appended by encapsulating the connection request packet with an outer header having a destination field containing the DIP. In other implementations, the DIP can be appended by modifying the existing header of the connection request packet or via other suitable techniques. The process 220 can then include transmitting the packet with the appended DIP to the host 106 at the DIP at stage 228. Subsequently, the process 220 can end by performing no further actions in facilitating establishment, packet transmission, or demolishment of the requested RDMA connection between the originating node and the destination node.

Figure 8A:
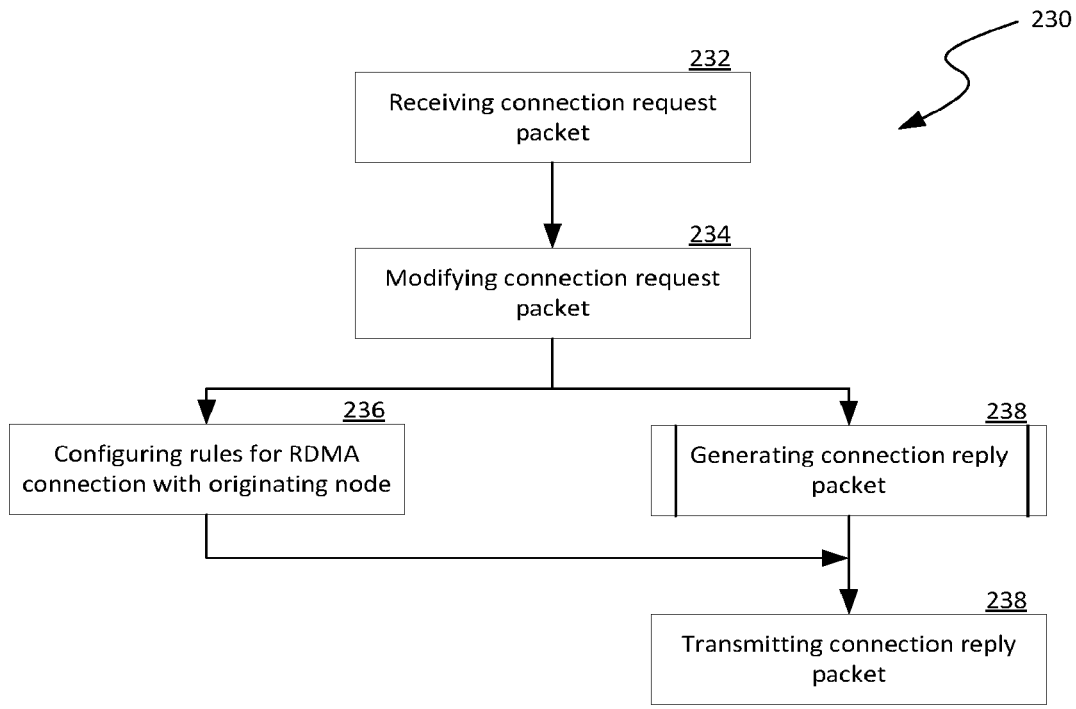
Figure 8B:
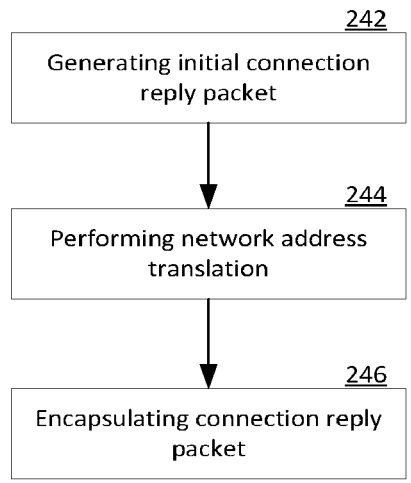

FIGS. 8A and 8B are flowcharts illustrating a process 230 for establishing an RDMA connection at a destination node in accordance with embodiments of the disclosed technology. As shown in FIG. 8A, the process 230 can include receiving a connection request packet from a load balancer 113 (FIG. 1) at stage 232. The connection request packet includes an encapsulated packet with a destination field in an outer header containing a destination IP of the destination node, and the inner header containing a destination address set to a virtual network address, e.g., virtual IP or "VIP."

The process 230 can then include modifying the connection request packet at stage 234. Suitable modifications can include decapsulating the connection request packet, changing the destination IP address from VIP to the destination IP, updating error checking codes, or performing other suitable operations. The process 230 can then include configuring rules for an RDMA connection with an originating node associated with the connection request packet at stage 236. Example rules are described above with reference to 4A-4C. The process 230 can also include generating a connection reply packet at stage 238. Example operations for generating the connection reply packet are described in more detail below with reference to FIG. 8B. The process 230 can then include transmitting the connection reply packet directly to the originating node and bypassing the load balancer at stage 238.

As shown in FIG. 8B, operations for generating the connection reply packet can include generating an initial connection reply packet between an originating node and a destination node at stage 242. The operations can also include performing network address translation for correct RDMA connection establishment at stage 244 once the reply packet is generated. During network name translation, a source field of the initial connection reply packet can be modified to contain the VIP included in the connection request packet. The operations can further include encapsulating the modified connection reply packet with an outer header having a destination field containing a network address of the originating node and a source field containing a network address of the destination node.

Figure 9:
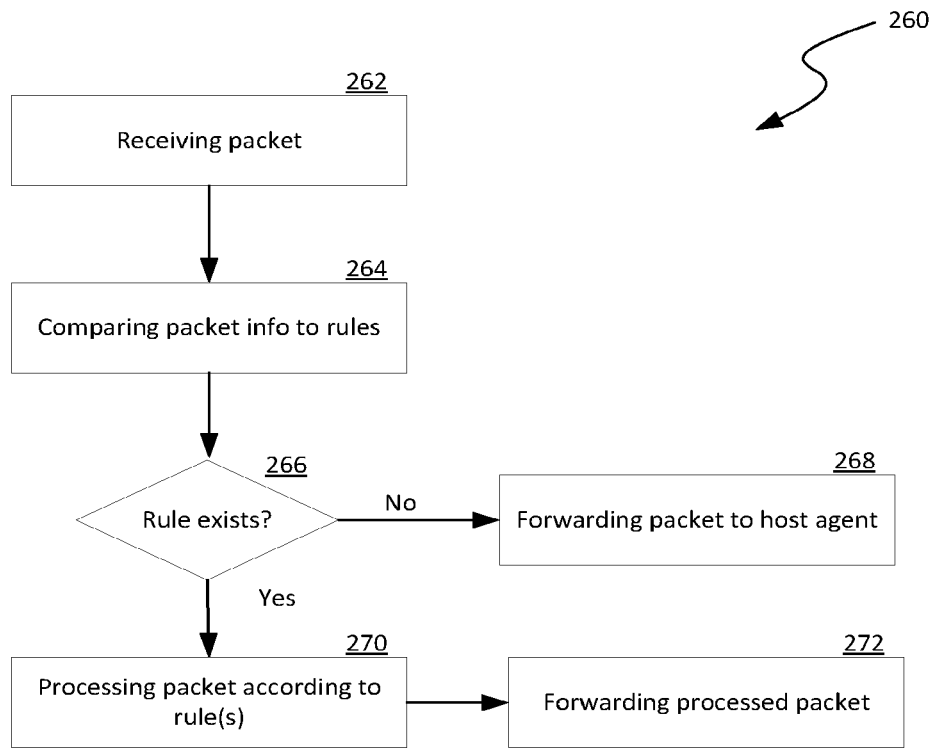
FIG. 9 is a flowchart illustrating a process of exchanging data via an established RDMA connection between an originating node and a destination node in accordance with embodiments of the disclosed technology.

FIG. 9 is a flowchart illustrating a process 260 for processing packets transmitted via an established RDMA connection in accordance with embodiments of the disclosed technology. Embodiments of the process 260 can be implemented in, for example, the packet handler 138 (FIG. 2), the network interface 136 (FIG. 2), the hypervisor 140 (FIG. 2), or other suitable components of the host 106 (FIG. 2).

As shown in FIG. 9, the process 260 includes receiving a packet at stage 262. The packet can include a header having a destination field, a source field, a source port, or other suitable control information. The process 260 can then include comparing the control information of the packet to rules at stage 264. The process 260 can include a decision stage 266 to determine whether at least one rule exists that is applicable to the received packet. In response to determining that no applicable rules exist, the process 260 can include forwarding the packet to a host agent for further processing at stage 268. In response to determining that at least one applicable rule exists the process 260, the process 260 can include processing the received packet according to the at least one rules at stage 270. The process 260 can then include forwarding the processed packet to, for example, a NIC, which in turn performs suitable direct memory operations in a host 106 according to data included in the received packet at stage 272.

Figure 10:
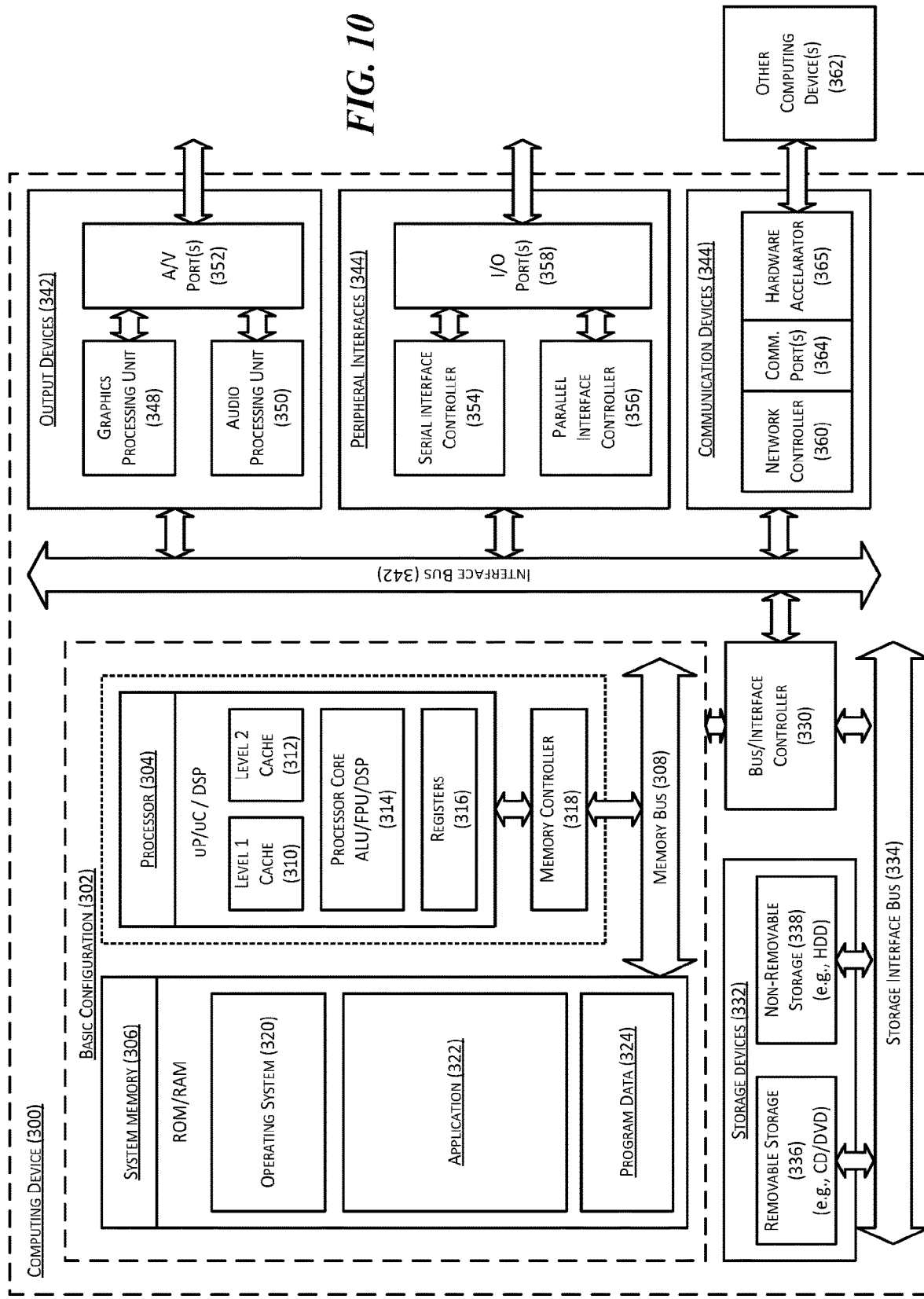
FIG. 10 is a computing device suitable for certain components of the distributed computing system in FIG. 1.

FIG. 10 is a computing device 300 suitable for certain components of the hybrid cloud computing system 100 in FIG. 1. For example, the computing device 300 can be suitable for the hosts 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360 and a hardware accelerator 365, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

What is claimed is:

1. A computerized system comprising:
one or more computer processors; and
computer memory storing computer-useable instructions that, when used by the one or more computer processors, cause the one or more computer processors to perform operations comprising:
announce, from a load balancer, one or more virtual network addresses associated with destinations for serving a remote direct memory access ("RDMA") request;
receive, at the load balancer and from an originating node via a computer network, a request packet for establishing an RDMA connection to a server associated with one of the one or more virtual network addresses, wherein the request packet includes an RDMA header configured based on the RDMA connection of the request packet;
select, using the load balancer, a destination node for the RDMA connection;
encapsulate, using the load balancer, the request packet with an outer header to generate an encapsulated request packet; and
forward, from the load balancer, the encapsulated request packet to the destination node based on the outer header, wherein the destination node can initiate communications with the originating node directly after processing the encapsulated request packet.

2. The computerized system of claim 1, the system further comprising:
a first server that transmits the request packet to the load balancer and receives a reply packet in response to the request packet from a second server,
wherein the first server comprises a rule configuration of an RDMA protocol, the RDMA protocol defines RDMA operation codes, the RDMA header is configurable based on the RDMA operation codes, and the rule configuration includes instructions for processing additional packets transmittable via the RDMA connection based on the reply packet, and
wherein the rule configuration further includes instructions to encapsulate an outgoing packet transmittable via the RDMA connection with a second outer header having a destination field containing a network address of the second server.

3. The computerized system of claim 2, wherein the rule configuration further includes instructions for enforcing, by a packet handler in the first server, encapsulation of the outgoing packet with the second outer header having the destination field containing the network address of the second server, such that the outgoing packet bypasses the load balancer to be deliverable directly to the second server, the packet handler including a field programmable gate array.

4. The computerized system of claim 2, wherein the rule configuration further includes instructions to encapsulate the outgoing packet transmittable via the RDMA connection with the second outer header having the destination field containing the network address of the second server when a header of the outgoing packet having a source field containing another network address of the first server and a port field containing a first port are assigned to the RDMA connection at the first server.

5. The computerized system of claim 2, wherein the rule configuration further includes instructions for processing additional packets transmittable via the RDMA connection based on the reply packet, a second rule being configured for enforcement by a packet handler to decapsulate an incoming packet to the first server via the RDMA connection by removing a third outer header having a second destination field containing another network address of the first server and a source field containing the network address of the second server.

6. The computerized system of claim 2, the operations further comprising:
generating, at the first server, a confirmation packet in response to the reply packet, the confirmation packet indicates that the RDMA connection with the second server is ready to be used;
processing the confirmation packet according to the rule configuration; and
transmitting the processed confirmation packet to the second server.

7. The computerized system of claim 1, wherein the RDMA header is configurable based on RDMA operation codes defined by an RDMA protocol, wherein the RDMA protocol comprises RDMA semantics that are different from Transmission Control Protocol/Internet Protocol ("TCP/IP"), and wherein the RDMA protocol includes instruction instructions for one or more of the following: address translation, packet encapsulation, packet decapsulation, and termination signaling.

8. One or more computer-storage media having computer-executable instructions embodied thereon that, when executed by a computing system having a processor and memory, cause the processor to:
announce, from a load balancer, one or more virtual network addresses associated with destinations for serving a remote direct memory access ("RDMA") request;
receiving, at the load balancer and from an originating node via a computer network, a request packet for establishing an RDMA connection to a server associated with one of the one or more virtual network addresses, wherein the request packet includes an RDMA header configured based on the RDMA connection of the request packet;
selecting, using the load balancer, a destination node for the RDMA connection;
encapsulating, using the load balancer, the request packet with an outer header to generate an encapsulated request packet; and
forwarding, from the load balancer, the encapsulated request packet to the destination node based on the outer header, wherein the destination node can initiate communications with the originating node directly after processing the encapsulated request packet.

9. The one or more computer-storage media of claim 8, the instructions further comprising:
a first server that transmits the request packet to the load balancer and receives a reply packet in response to the request packet from a second server,
wherein the first server comprises a rule configuration of an RDMA protocol, the RDMA protocol defines RDMA operation codes, the RDMA header is configurable based on the RDMA operation codes, and the rule configuration includes instructions for processing additional packets transmittable via the RDMA connection based on the received reply packet, and
wherein the rule configuration further includes instructions to encapsulate an outgoing packet transmittable via the RDMA connection with a second outer header having a destination field containing a network address of the second server.

10. The one or more computer-storage media of claim 9, wherein the rule configuration that further includes instructions for enforcing, by a packet handler in the first server, encapsulation of the outgoing packet with the second outer header having the destination field containing the network address of the second server, such that the outgoing packet bypasses the load balancer to be deliverable directly to the second server, the packet handler including a field programmable gate array.

11. The one or more computer-storage media of claim 9, wherein the rule configuration further includes instructions to encapsulate the outgoing packet transmittable via the RDMA connection with the second outer header having the destination field containing the network address of the second server when a header of the outgoing packet having a source field containing another network address of the first server and a port field containing a first port are assigned to the RDMA connection at the first server.

12. The one or more computer-storage media of claim 9, wherein the rule configuration further includes instructions for processing additional packets transmittable via the RDMA connection based on the reply packet, a second rule being configured for enforcement by a packet handler to decapsulate an incoming packet to the first server via the RDMA connection by removing a third outer header having a second destination field containing another network address of the first server and a source field containing the network address of the second server.

13. The one or more computer-storage media of claim 9, the instructions further comprising:
generating, at the first server, a confirmation packet in response to the reply packet, the confirmation packet indicates that the RDMA connection with the second server is ready to be used;
processing the confirmation packet according to the rule configuration; and
transmitting the processed confirmation packet to the second server.

14. The one or more computer-storage media of claim 8, wherein the RDMA header is configurable based on RDMA operation codes defined by an RDMA protocol, wherein the RDMA protocol comprises RDMA semantics that are different from Transmission Control Protocol/Internet Protocol ("TCP/IP"), and wherein the RDMA protocol includes instructions for one or more of the following: address translation, packet encapsulation, packet decapsulation, and termination signaling.

15. A computer-implemented method, the method comprising:
announcing, from a load balancer, one or more virtual network addresses associated with destinations for serving a remote direct memory access ("RDMA") request;
receiving, at the load balancer and from an originating node via a computer network, a request packet for establishing an RDMA connection to a server associated with one of the one or more virtual network addresses, wherein the request packet includes an RDMA header configured based on the RDMA connection of the request packet;
selecting, using the load balancer, a destination node for the RDMA connection;
encapsulating, using the load balancer, the request packet with an outer header to generate an encapsulated request packet; and
forwarding, from the load balancer, the encapsulated request packet to the destination node based on the outer header, wherein the destination node can initiate communications with the originating node directly after processing the encapsulated request packet.

16. The computer-implemented method of claim 15, the method further comprising:
transmitting, by a first server the request packet to the load balancer
receiving, at the first server from a second server, a reply packet in response to the request packet,
wherein the first server comprises a rule configuration of an RDMA protocol, the RDMA protocol defines RDMA operation codes, the RDMA header is configurable based on the RDMA operation codes, and the rule configuration includes instructions for processing additional packets transmittable via the RDMA connection based on the reply packet, and
wherein the rule configuration further includes instructions to encapsulate an outgoing packet transmittable via the RDMA connection with a second outer header having a destination field containing a network address of the second server.

17. The computer-implemented method of claim 16, wherein the rule configuration further includes instructions for enforcing, by a packet handler in the first server, encapsulation of the outgoing packet with the second outer header having the destination field containing the network address of the second server, such that the outgoing packet bypasses the load balancer to be deliverable directly to the second server, the packet handler including a field programmable gate array.

18. The computer-implemented method of claim 16, wherein the rule configuration further includes instructions to encapsulate the outgoing packet transmittable via the RDMA connection with the second outer header having the destination field containing the network address of the second server when a header of the outgoing packet having a source field containing another network address of the first server and a port field containing a first port are assigned to the RDMA connection at the first server.

19. The computer-implemented method of claim 16, wherein the rule configuration further includes instructions for processing additional packets transmittable via the RDMA connection based on the reply packet, a second rule being configured for enforcement by a packet handler to decapsulate an incoming packet to the first server via the RDMA connection by removing a third outer header having a second destination field containing another network address of the first server and a source field containing the network address of the second server.

20. The computer-implemented method of claim 15, wherein the RDMA header is configurable based on RDMA operation codes defined by an RDMA protocol, wherein the RDMA protocol comprises RDMA semantics that are different from Transmission Control Protocol/Internet Protocol ("TCP/IP"), and wherein the RDMA protocol includes instructions for one or more of the following: address translation, packet encapsulation, packet decapsulation, and termination signaling.

* * * * *